Feb. 19, 1952     E. D. HALEY     2,586,032
MACHINE FOR PLANTING GRAIN BETWEEN
ROWS OF STANDING CORN AND THE LIKE
Filed Dec. 9, 1949     2 SHEETS—SHEET 1
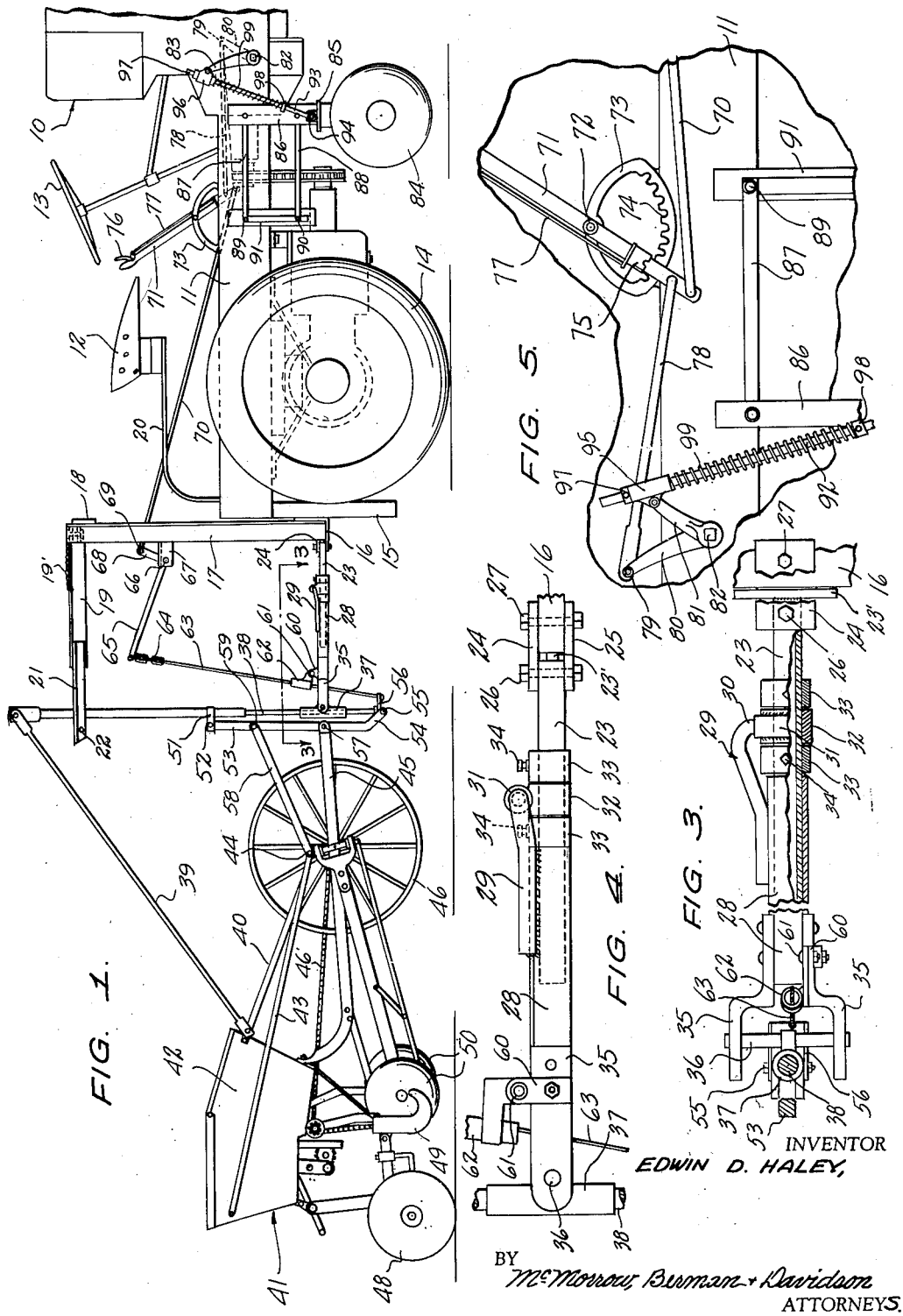
INVENTOR
EDWIN D. HALEY,
BY McMorrow, Berman + Davidson
ATTORNEYS.

Feb. 19, 1952     E. D. HALEY     2,586,032
MACHINE FOR PLANTING GRAIN BETWEEN
ROWS OF STANDING CORN AND THE LIKE
Filed Dec. 9, 1949     2 SHEETS—SHEET 2
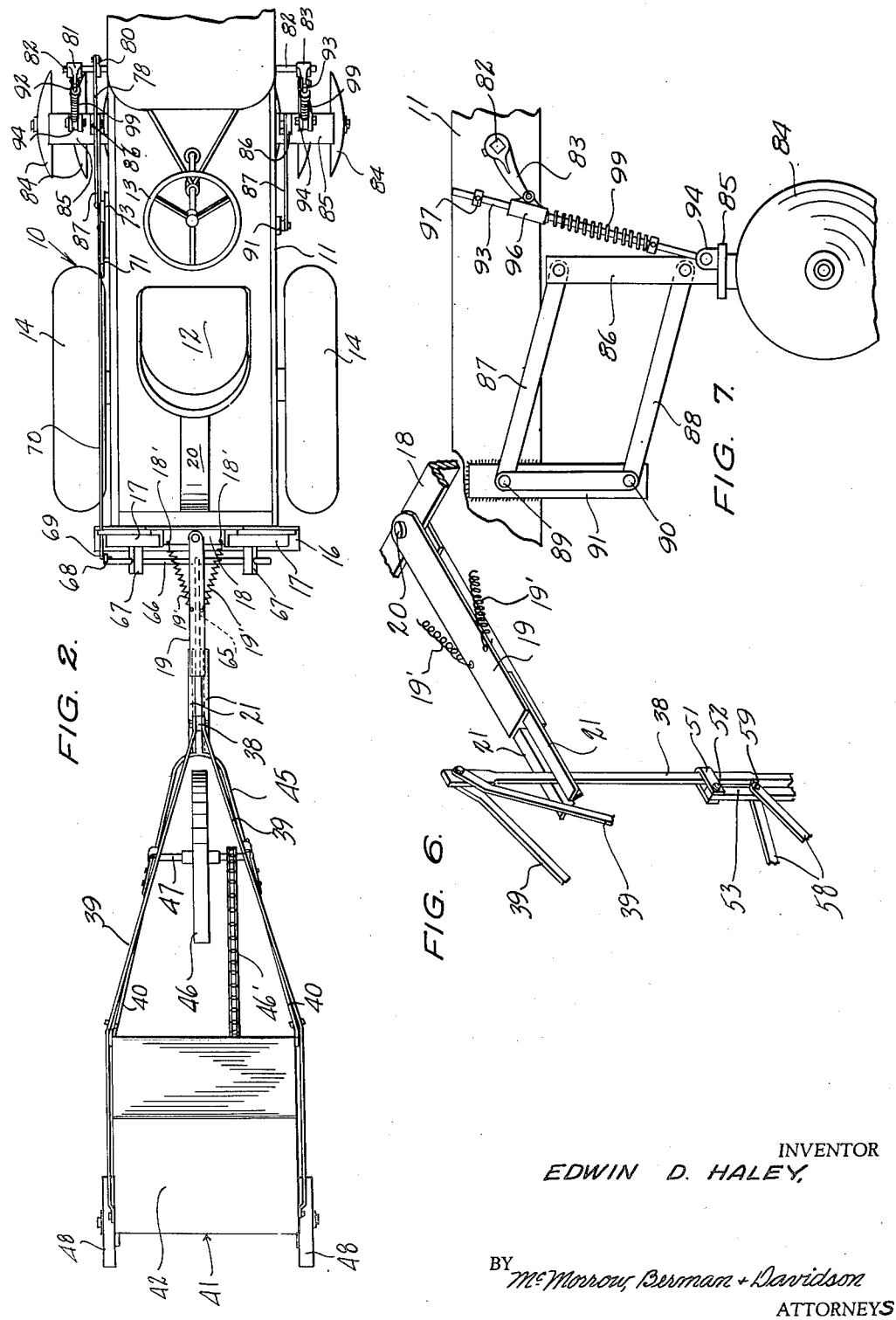
INVENTOR
*EDWIN D. HALEY*,
BY *McMorrow, Berman + Davidson*
ATTORNEYS

Patented Feb. 19, 1952

2,586,032

UNITED STATES PATENT OFFICE 2,586,032

MACHINE FOR PLANTING GRAIN BETWEEN ROWS OF STANDING CORN AND THE LIKE

Edwin D. Haley, McComb, Ohio

Application December 9, 1949, Serial No. 131,963

4 Claims. (Cl. 97—47)

My invention relates to a machine for planting grain between rows of standard corn and the like.

The primary object of my invention is to provide a machine of the above-mentioned character embodying a novel hitch device for connecting a narrow gauge grain drill or planter with the rear end of a narrow gauge tractor, so that wheat or other small grain may be planted between rows of standing corn.

A further object is to provide a machine of the above-mentioned character including a hitch device operable from the driver's seat of a tractor for raising and lowering the grain drill or planter out of and into its operative position.

A further object is to provide a novel hitch device for connecting the grain drill with the rear end of a tractor, whereby the tractor and drill may negotiate turns without liability of upsetting the grain drill.

A further object is to provide a hitch device of the above-mentioned character, operable to raise the forward end of the grain drill above the ground so that the tractor may pass from one field to another without sowing seed during such passage.

A further object is to provide a hitch device for connecting a tractor with a conventional grain drill or planter, the hitch device being operated by a single operating lever arranged adjacent to the driver's seat of the tractor, whereby the grain drill may be readily shifted from the operative to the inoperative position.

A still further object is to provide a machine of the above-mentioned character which is simplified, compact, easy to operate, sturdy and relatively inexpensive to manufacture.

Other objects and advantages of the invention will be apparent during the course of the following description.

In the accompanying drawings forming a part of this application, and in which like numerals are employed to designate like parts throughout the same:

Figure 1 is a side elevation of a grain-planting machine embodying my invention, with parts broken away;

Figure 2 is a plan view of the machine, with parts broken away;

Figure 3 is an enlarged fragmentary horizontal section taken on line 3—3 of Figure 1;

Figure 4 is a side elevation of the elements shown in Figure 3;

Figure 5 is an enlarged fragmentary side elevation of tractor disc-operating mechanism;

Figure 6 is a fragmentary perspective view of the top portion of a hitch; and

Figure 7 is an enlarged fragmentary side elevation of tractor disc-operating mechanism in position for having the tractor discs engaging the ground.

In the drawings, where, for the purpose of illustration, is shown a preferred embodiment of my invention, the numeral 10 designates generally the narrow gauge tractor. This tractor 10 includes the usual horizontal main frame 11 having the usual driver's seat 12 mounted thereabove. The steering wheel 13 is arranged forwardly of the driver's seat 12, and the tractor has the usual rear large traction wheel 14. Rigidly secured to the rear end of the main frame 11 are a pair of laterally spaced, depending, rigid bars 15 having a transverse, horizontal drawbar 16 rigidly secured thereto by welding or the like.

Rigidly secured to the drawbar 16 and extending vertically above the frame and above the top of the main frame 11, as shown, is a vertical support or mounting frame including laterally oppositely disposed, upwardly converging bars 17 rigidly connected at their tops by a horizontal, transverse bar 18 rigidly secured thereto by welding or the like. Pivotally connected with the bar 18 in the longitudinal center thereof is a horizontal, rearwardly extending bar or beam 19 having its forward end pivotally connected with the bar 18 for movement about a vertical axis, as at 20. The beam 19 extends longitudinally rearwardly of the bar 18 for a substantial distance, and is provided at its rear end with a pair of laterally spaced, rear, longitudinal extensions or bars 21. A pair of strong, retractile coil springs 19' have their rearward ends secured to opposite sides of the beam 19, near the longitudinal center of the beam, and the front ends of these springs are connected to the bar 18 at points 18' upon opposite sides of the beam 19, Figures 2 and 6. The arrangement is such that the beam 19 may swing horizontally about its pivot 20, but the springs 19' tend to return it to its central longitudinally extending position, Figure 2.

Arranged directly below the bar 19 and adjacent to the drawbar 16, and extending longitudinally rearwardly of the drawbar is a horizontal cylindrical hitch bar or shaft 23 having rigidly secured to its forward end by welding or the like a rigid, transverse locking bar 23'. The locking bar 23' is arranged adjacent to the rear of the drawbar 16, Figures 3 and 4, and upper and lower hitch plates 24 and 25 have their rear and forward ends respectively connected with the hitch bar 23 and drawbar 16 by bolts 26 and 27. The arrangement is such that a rigid connection between the hitch bar 23 and drawbar 16 is formed, whereby the hitch bar cannot swing horizontally, because the locking bar 23' engages the drawbar 16 to prevent this. The rear end of the cylindrical hitch bar 23 engages telescopically within a tube 28 having a generally U-shaped strap or bracket 29 welded to its top, and including a forward, transverse pin 30 arranged forwardly of the end of the tube 28 and engaging in a short, transverse sleeve 31 welded to the top of a short, longitudinal sleeve 32. The sleeve 32 slidably receives the hitch bar 23 therein longitudinally forwardly of the forward end of the tube 28, as shown. The sleeve 32 is fixedly secured to the tube 28 by means of the transverse sleeve 31 and generally U-shaped bracket 29. A pair of adjustable sleeves or collars 33 are mounted upon the hitch bar 23 forwardly and rearwardly of the sleeve 32, and the sleeves 33 are locked in selected, adjusted positions upon the bar 23 by set screws 34 or the like. By means of the set screws 34 and collars 33, it is obvious that the hitch bar 23 may be adjusted longitudinally within the tube 28.

Rigidly secured to the rear end of the tube 28 and arranged upon opposite sides of the same are transversely oppositely disposed brackets or arms 35 spaced apart transversely beyond the rear end of the tube 28, Figure 3. The arms 35 have aligned apertures pivotally receiving a transverse pin 36 having rigidly mounted thereon for rotation therewith a generally vertically disposed, short tube 37 slidably receiving therein for reciprocation a generally vertical, elongated, straight rod 38. The rod 38 is disposed in the transverse center of the tractor and extends vertically upwardly beyond the arm or bar 19 and between the extensions 21 thereof longitudinally forwardly of the pin 22. The rod 38 is slidable between the extensions 21. The bottom end of rod 38 extends below the bottom of the sleeve or tube 37, as shown.

The top of the rod 38 is fixedly connected with the forward ends of elongated, straight, downwardly inclined braces or rods 39 which diverge rearwardly and have their rear ends pivotally connected with the rear ends of braces 40 of a conventional grain drill or planter, designated generally by the numeral 41. The braces 40 constitute elements of the grain drill and have their rear ends connected with the upper forward corners of a grain box or hopper 42. Additional longitudinal braces 43 are connected at their rear ends near the rear upper corners of the hopper 42 and at their forward ends with the forward ends of the braces 40, as shown at 44. The drill or planter 41 further includes the usual generally horizontal support frame 45 having its forward end supported by a ground-engaging, large wheel 46 mounted upon a transverse axle 47 journaled upon the opposite sides of the frame 45. The rear end of the grain drill is supported by wheels 48, and the grain drill includes the usual depending grain shoes 49 which distribute the grain rearwardly of the furrow-forming discs 50 rigidly mounted beneath the hopper 42 in a conventional manner. The construction of the drill or planter 41 is conventional and well known. The arrangement is such that when the support frame 45 of the drill has its forward end raised or lowered, the large wheel 46, discs 50 and grain shoes 49 are likewise raised and lowered out of and into operative relation with the ground. When the wheel 46 engages the ground, it operates gearing, including sprocket chain 46', for causing the drill 41 to plant or distribute the grain.

A short, rearwardly extending bracket 51 is rigidly mounted upon the rod 38 near the longitudinal center of such rod, and connected with the bracket 51, as at 52, is an elongated vertical bar 53 extending downwardly adjacent to the rear side of the rod 38 and terminating in a short, forwardly inclined extension 54 connected at its bottom end, as shown at 55, with a short, forwardly extending bracket 56, in turn rigidly secured to the bottom of the rod 38. As shown at 57, the forward end of the drill support frame 45 is fixedly connected with the bar 53 near and below the longitudinal center of such bar. Relatively short, longitudinal, inclined braces 58, forming parts of the grain drill 41, have their forward ends fixedly connected, as at 59, with the bar 53, below the top of the same, and the rear ends of the braces 58 are connected at 44 with the forward ends of the braces 40 and 43, as shown in Figure 1.

Rigidly mounted upon the top side of one of the brackets 35 is an upstanding, apertured bracket 60 having pivotally mounted thereon, as at 61, a vertically swingable tube guide 62 slidably receiving a cable 63, having its bottom end extending below the brackets 35 and connected with the forward end of the bracket 56, as shown. The top end of the cable 63 may be connected with a short chain 64 connected at its top with a rearwardly extending, inclined, elongated arm 65 of a bell crank lever, rigidly mounted upon a horizontal, transverse rock shaft 66 journaled at its opposite ends upon blocks or bearings 67 rigidly secured to the upstanding bars 17 near and above the longitudinal centers of such bars. The bell crank lever also includes a forward, upstanding, short arm 68 pivotally connected, as at 69, with the rear end of an elongated, inclined, longitudinally shiftable control rod 70 arranged adjacent to one side of the main frame 11 of the tractor. The arm 68 of the bell crank lever is secured to the end of the rock shaft 66 adjacent to the control rod 70, as shown in Figure 2. When the shaft 66 rocks or rotates, the arms 65 and 68 swing in a vertical plane. The forward end of the control rod 70 extends forwardly of the driver's seat 12 and is pivotally connected with the bottom end of a vertically swingable control lever 71 pivotally mounted above its lower end, as at 72, upon a vertically disposed, adjusting sector 73 rigidly mounted upon the adjacent side of the main frame 11 and including an arcuate group of teeth 74 for coaction with a locking pawl device in the form of a sleeve 75 slidably mounted upon the lower portion of the lever 71, and raised and lowered along the lever 71 by means of the usual pivoted squeeze lever 76 and connecting rod 77. When the lever 71 is swung by the driver of the tractor, it is obvious that the control rod 70 will be shifted longitudinally.

Pivotally connected with the bottom of the lever 71 slightly above the control rod 70 is a relatively short, forwardly longitudinally extending control rod 78 disposed generally horizontally and having its forward end arranged adjacent to the rear end of the tractor engine. The control rod 78 has its forward end pivotally connected, as at 79, with the forward, upstanding arm 80 of a generally V-shaped bell crank lever including an integral, rearwardly inclined arm 81 integral with the arm 80. The bell crank lever having the arms 80 and 81 is adapted to swing in a vertical plane close to the adjacent side of the main frame 11 of the tractor. This bell crank lever is mounted upon the square, transverse, horizontal shaft 82 extending transversely of the main frame 11 of the tractor for the entire width of the main frame and laterally outwardly beyond both sides of the same.

The shaft 82 is rotatably or rockably mounted upon the main frame of the tractor and is rocked when the arm 80 of the V-shaped bell crank lever is swung vertically. The end of the square shaft 82 remote from the arm 80, control rod 78 and associated elements, has rigidly mounted thereon an upstanding lever or crank 83 adapted to swing vertically and disposed close to the adjacent side of the frame 11 of the tractor.

The tractor 10 is equipped with a set of plow discs 84 dependingly mounted below the main frame 11 and slightly forwardly of and below the steering wheel 13.

The plow discs 84 are mounted upon a frame, the frame including a top, horizontal plate or bar 85 extending transversely of the tractor below the main frame 11 thereof, and laterally outwardly beyond both sides of the tractor main frame. Near and inwardly of the opposite ends of the bar 85, the same has rigidly mounted thereon upstanding vertical posts or plates 86 disposed adjacent to the sides of the main frame 11. Vertically spaced, horizontal links 87 and 88 have their forward ends pivotally connected with the posts 86 near the tops and bottoms of the posts, respectively. The rear ends of the links 87 and 88 are pivotally connected, as at 89 and 90, with vertical bars 91 fixedly secured to the adjacent sides of the frame 11 forwardly of the wheel 14 and depending below the bottom of the frame 11, as shown. The links 87 and 88 are freely swingable vertically in unison for raising and lowering the posts 86, in turn raising and lowering the bar 85 and plow discs 84. Laterally outwardly of the posts 86, upstanding, generally vertical rods 92 and 93 are pivotally connected at their bottom ends with apertured lugs 94 rigidly secured to the top of the bar 85 outwardly of the posts 86. The tops of the rods 93 extend adjacent to the top of the bell crank arm 81 and crank or lever 83, as shown, and the tops of the rods slidably engage within the sleeves 95 and 96 pivotally connected with the top of the arm 81 and lever 83, respectively. The rods 92 and 93 have fixedly mounted thereon near their top ends stop collars or rings 97 to limit the upward travel of the sleeves 95 and 96 along the rods 92 and 93. Similar stop collars 98 are fixedly secured to the rods 92 and 93 near and above their bottom ends, and strong, expansible coil springs 99 surround the rods 92 and 93 between the stop collars 98 in the bottoms of the sleeves 95 and 96. The springs 99 serve to bias the plow discs 84 downwardly. The arm 81 and lever 83 are swingable vertically through the operation of the control lever 71 to raise and lower the group of plow discs 84.

The operation of the machine is as follows:

With the parts assembled, as shown and described, the tractor 10 is driven forwardly in the usual manner between adjacent standing rows of corn or the like. The tractor is of a narrow gauge type, as is the drill or planter 21, so that the tractor and drill may pass between adjacent standing rows of corn. The hitch device shown and described and connecting the rear end of the tractor with the drill 41 permits the tractor and drill to negotiate turns at the ends of rows and the like with ease and without liability of the drill 41 upsetting. The plow discs 84 of the tractor and the discs 50 and grain shoe 49 of the drill are simultaneously shifted to and from their operative positions by means of a single operating lever 71 adjacent to the driver's seat of the tractor.

With the lever 71 pulled rearwardly, as in Figure 1, both of the sets of discs 84 of the tractor and forward end of the drill 41 will be elevated, as shown in Figure 1. When the lever 71 is swung forwardly, the plow discs 84 and forward end of the drill 41 will be lowered simultaneously into operative engagement with the ground. When the lever 71 is swung forwardly, the sleeve 75 first being disengaged from the teeth 74, the forwardly extending operating rod 78 is shifted longitudinally rearwardly, Figure 1, and the arm 81 of the V-shaped bell crank lever swings downwardly vertically, lowering the sleeves 95 and 96 in opposition to the force of the spring 99, which through the stop collars 98 cause the rods 92 and 93 to be lowered, shifting the plow discs 84 into operative engagement with the ground. Simultaneously, when the lever 71 is swung forwardly, the rod 70 is shifted longitudinally rearwardly, lowering the arm 65 and cable 63 and lowering the rod 38 within the guide tube 37 and between the extensions 21. When the rod 38 is thus lowered, the bar 53 will be lowered with it, lowering the drill support frame 45, wheel 46, discs 50 and seed or grain shoes 49. The grain drill is thus simultaneously lowered into operative relation with the ground.

The tractor may turn freely in either direction, and both the tractor and drill 41 may negotiate turns together because of the pivotal connection between the rod 38 and tube 37. The point of pivot or hinged connection between the tractor and grain drill is thus along the vertical axis of the rod 38, the hitch bar 23 being held against swinging movement by the locking bar 23', as previously described. Likewise, the vertical rod 38 is rotatable between the extensions 21 and within the tube 37. The rods or braces 39 prevent any tendency of the drill 41 to turn over, as do the extensions 21, which receive the rod 38 between them. As is obvious, when the lever 71 is again pulled rearwardly and locked by means of the sleeve 75 and teeth 74 in the rearmost position, the plow discs 84 and forward end of the drill 41 will again be simultaneously raised out of operative relation with the ground. With the discs 84 and forward end of the drill thus raised, the tractor and drill may be driven from field to field without plowing or sowing seed on the way.

It is to be understood that the form of my invention herewith shown and described is to be taken as a preferred example of the same, and that various changes in shape, size and arrangement of parts may be resorted to without departing from the spirit of my invention or the scope of the subjoined claims.

Having thus described my invention, I claim:

1. A hitch device for connecting the rear end of a tractor equipped with a drawbar to the forward end of a grain drill frame or the like, said hitch device comprising an upstanding frame mounted upon the drawbar and projecting above the same for a substantial distance adjacent to the rear end of the tractor, a rearwardly longitudinally extending bar secured to the top of the upstanding frame and having a guide opening, an elongated vertically shiftable rod slidably engaging in the guide opening and having its bottom end extending near and below the drawbar of the tractor, a substantially horizontal longitudinally extending hitch bar having its forward end connected with the drawbar and having a generally vertical sleeve pivotally connected with its rear end, the sleeve receiving said vertical rod therein for reciprocation, a member secured to the generally vertical rod for movement therewith and arranged longitudinally rearwardly of the sleeve, the forward end of the grain drill frame being fixedly connected with said member to be raised and lowered thereby, a bell crank lever mounted upon said upstanding frame, a flexible element connected with said bell crank lever and with the bottom of the generally vertical rod, and mechanical means operable from the driver's seat of the tractor and connected with the bell crank lever to swing it for raising and lowering the generally vertical rod and member to elevate and lower the forward end of the grain drill frame.

2. A hitch device for connecting a grain drill with the rear end of a tractor having a drawbar, said grain drill including a generally horizontal support frame adapted to have its forward end raised and lowered, said hitch device comprising a substantially vertical frame mounted upon the drawbar of the tractor and extending above the same for a substantial distance, a rearwardly extending substantially horizontal bar pivotally connected with the top of the frame and disposed at the transverse center of the tractor, said rearwardly extending bar having a guide opening formed therein near its rear end, a substantially horizontal longitudinally extending hitch bar having its forward end connected with the drawbar near the transverse center of the drawbar and extending below and substantially parallel to said longitudinally rearwardly extending bar, a vertically swingable guide tube pivotally mounted upon the rear end of said hitch bar, an elongated substantially vertical rod slidably mounted within said guide tube and extending through said guide opening of said longitudinally rearwardly extending bar, a vertical bar secured to the rear side of the substantially vertical rod and disposed rearwardly of the guide tube, the forward end of the grain drill support frame being fixedly connected with said last-named bar between its ends, a vertically swingable bell crank lever pivotally mounted upon the vertical frame near and below the top of the frame, a generally vertical cable connected with the bell crank lever and with the bottom of the elongated vertical rod below the guide tube, a longitudinally extending control rod having its rear end pivotally connected with the bell crank lever and its forward end terminating adjacent to the driver's seat of the tractor, and a lever pivotally mounted upon the tractor adjacent to the driver's seat and operatively connected with the forward end of the control rod for shifting such rod longitudinally to raise and lower the forward end of the grain drill support frame.

3. A hitch device for connecting the rear end of a tractor equipped with a drawbar to the forward end of a gain drill frame, said hitch device comprising an upstanding frame mounted upon said drawbar, a rearwardly longitudinally extending bar secured to the top of said frame and having a guide means, a vertically disposed rod slidably engaging in said guide means, the longitudinally extending hitch bar having its forward end connected with said drawbar and having a vertical sleeve pivotally connected with its rear end, the sleeve receiving said vertical rod thereon for reciprocation, a member secured to said rod for movement therewith and arranged longitudinally rearwardly of said sleeve, the forward end of said grain drill frame being fixedly connected with said member to be raised and lowered thereby, and a hand actuable means operatively connected to the bottom of said vertical rod for raising and lowering said rod and member to elevate and lower the forward end of the grain drill frame.

4. A hitch device for connecting the rear end of a tractor equipped with a drawbar to the forward end of a grain drill frame, said hitch device comprising an upstanding frame mounted upon said drawbar, a rearwardly longitudinally extending bar connected to the top of said frame for movement about a vertical axis and having a guide means, a vertically disposed rod slidably engaging in said guide means, a longitudinally extending hitch bar having its forward end connected with said drawbar and having a vertical sleeve pivotally connected with its rear end, the sleeve receiving said vertical rod therein for reciprocation, a member secured to said rod for movement therewith and arranged longitudinally rearwardly of said sleeve, the forward end of said grain drill frame being fixedly connected with said member to be raised and lowered thereby, resilient means operatively connected to said bar and said frame for urging said bar toward its longitudinally extending position, and hand actuable means operatively connected to the bottom of said vertical rod for raising and lowering said rod and member to elevate and lower the forward end of the grain drill frame.

EDWIN D. HALEY.

REFERENCES CITED

The following references are of record in the file of this patent:

UNITED STATES PATENTS

| Number | Name | Date |
| --- | --- | --- |
| 1,233,375 | Lindsten | July 17, 1917 |
| 1,663,249 | Graham et al. | Mar. 20, 1928 |
| 2,076,673 | Roper | Apr. 13, 1937 |
| 2,248,505 | McKahin | July 8, 1941 |
| 2,346,330 | Ratcliff | Apr. 11, 1944 |